UNITED STATES PATENT OFFICE.

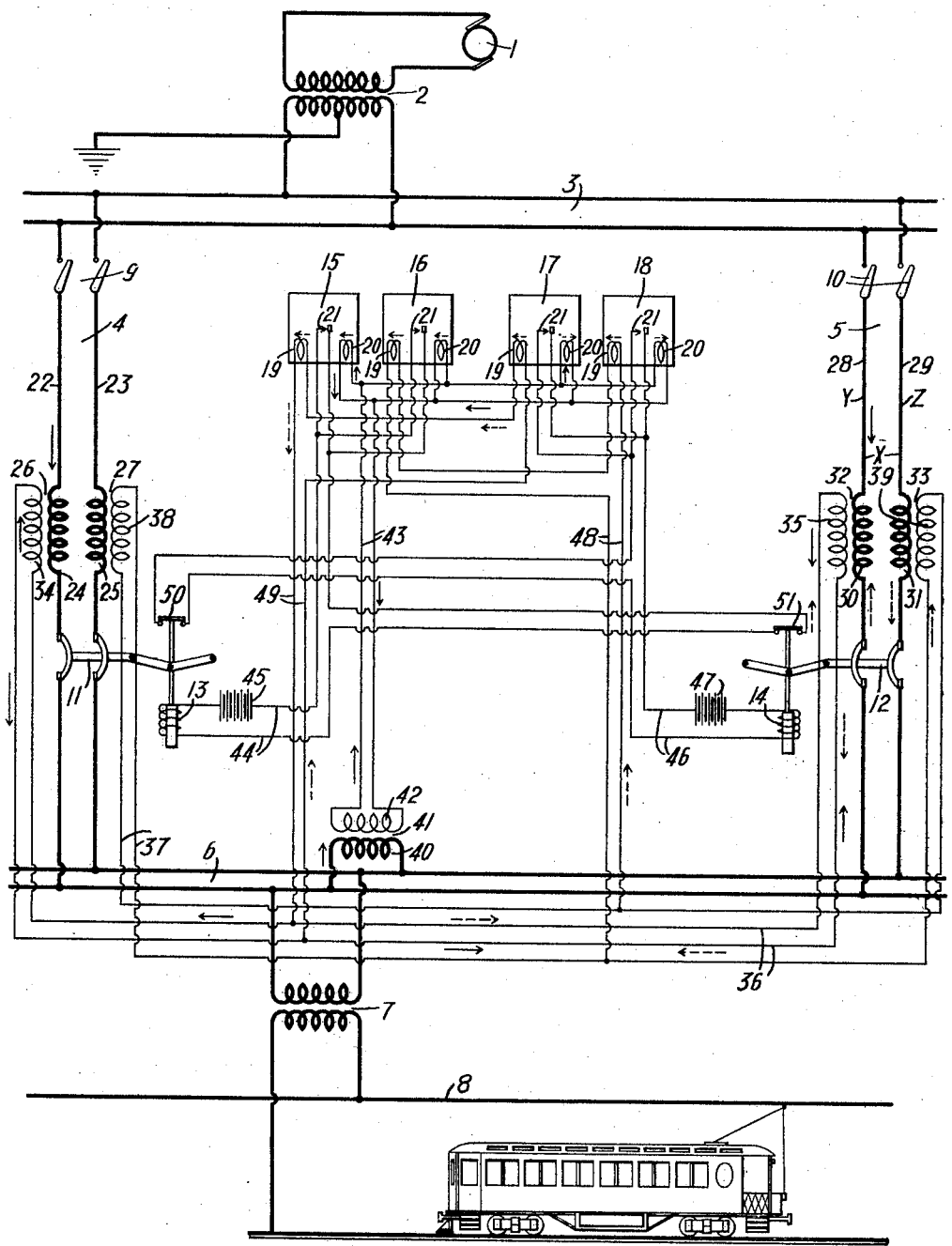

CHARLES McL. MOSS, OF PITTSBURGH, FREDERIC C. HANKER AND HENRY A. TRAVERS, OF WILKINSBURG, AND FRANK CONRAD, OF SWISSVALE, PENNSYLVANIA, ASSIGNORS TO WESTINGHOUSE ELECTRIC AND MANUFACTURING COMPANY, A CORPORATION OF PENNSYLVANIA.

SYSTEM OF ELECTRICAL DISTRIBUTION.

1,320,083.     Specification of Letters Patent.     Patented Oct. 28, 1919.

Application filed June 4, 1915. Serial No. 32,203.

*To all whom it may concern:*

Be it known that we, CHARLES McL. MOSS, FREDERIC C. HANKER, HENRY A. TRAVERS, and FRANK CONRAD, citizens of the United States, and residents, respectively, of Pittsburgh, Wilkinsburg, Wilkinsburg, and Swissvale, in the county of Allegheny and State of Pennsylvania, have invented a new and useful Improvement in Systems of Electrical Distribution, of which the following is a specification.

Our invention relates to systems of electrical distribution and particularly to methods of protecting such systems when short circuits or grounds occur thereon.

The object of our invention is to provide means for selectively disconnecting faulty feeders from a distribution system, irrespective of the direction of flow of energy in the system.

One of the methods of protecting a distribution system against grounds and short circuits is to so employ reverse-energy relays that, when the energy reverses by reason of a ground or short circuit in the system, the relays operate to disconnect the faulty circuit from the system. However, in systems where the energy may flow normally in either direction, such as in railway systems having locomotives that regenerate energy, the use of reverse-energy relays without other apparatus is impracticable because they operate to disconnect the circuits whenever energy is regenerated. In order to take care of a distribution system wherein energy may flow in either direction, we provide auxiliary circuits for combining currents proportional to the currents traversing the respective conductors of the parallel-feeder circuits constituting the system. We provide also reverse-energy relays that are energized by currents proportional to the resultant of the combined currents and with voltage proportional to the voltage of the distributing circuits to which the feeder circuits are connected. By using a system of this kind, when the energy reverses in one pair of feeders with respect to another, current will traverse the auxiliary circuits to thus actuate the reverse-energy relays. The reverse-energy relays are arranged in pairs having their voltage windings so connected 180° out of phase with each other, that, no matter in which direction the current traverses the auxiliary circuits, the faulty feeder circuit will be disconnected from the system.

The single figure of the accompanying drawing is a diagrammatic illustration of a single-phase distributing system in which is embodied our invention.

A generator 1 supplies energy to a transformer 2 which, in turn, is connected to a transmission circuit 3. Two feeder circuits 4 and 5 are severally connected, at one end, to the transmission circuit 3 and terminate, at their other end, in a distributing circuit 6 which is connected, through a transformer 7, to a trolley circuit 8, substantially as shown. Circuit interrupters or switches 9 and 10 are interposed between the transmission circuit 3 and the feeder circuits 4 and 5, respectively, and circuit interrupters 11 and 12 are interposed between the distribution circuit 6 and the feeder circuits 4 and 5, respectively. The circuit interrupters 11 and 12 are provided with trip coils 13 and 14, respectively, for the purpose of disconnecting either of the feeder circuits from the distributing circuit under abnormal conditions hereinafter set forth.

Four reverse-energy relays 15, 16, 17 and 18 are provided for the purpose of energizing the windings of the trip coils 13 and 14 when a ground or short circuit occurs on either of the feeder circuits 4 or 5. Each of the relays 15, 16, 17 and 18 comprises a current winding 19, a voltage winding 20 and a contact-making device 21.

The feeder circuit 4 comprises two conductors 22 and 23, in circuit with which are connected the primary windings 24 and 25 of the transformers 26 and 27, respectively. The feeder circuit 5 comprises two conductors 28 and 29 that have connected in circuit therewith the primary windings 30 and 31 of the transformers 32 and 33, respectively. The secondary winding 34 of the transformer 26 is connected in circuit with the secondary winding 35 of the transformer 32. The transformers 26 and 32 are so cumulatively connected that, when the same amount of current traverses the conductors 22 and 28 in the same direction, equal potential points will obtain in the auxiliary circuit 36 thus constituted. A circuit 37, similar to circuit 36, is provided for cumulatively connecting the secondary windings 38 of the transformer 37 and the secondary winding 39 of the transformer 33.

The primary winding 40 of a transformer 41 is connected across the conductors of the distributing circuit 6, and the secondary winding 42 is connected, through a circuit 43, to the windings 20 of the relays 15, 16, 17 and 18. The windings 20 of the relays 15 and 16 are so connected that current traverses each in the same direction, and the windings 20 of the relays 17 and 18 are so connected that current traverses them in a direction opposite to that in which it traverses the winding 20 of the relays 15 and 16. The windings 19 of the relays 15 and 17 are connected in series, and the circuit 49 thus constituted is connected in parallel relation to the normally equal potential points of the auxiliary 36. The windings of the relays 16 and 18 are similarly connected in series, and the circuit 48 thus constituted is connected in parallel relation to the equal potential points of the auxiliary circuit 37.

A local circuit 44 comprises a source of electromotive force 45, the trip coil winding 13, a switch 51 and the contact-making devices 21 of the relays 15 and 16, these contact-making devices being so connected in parallel that the winding 13 will be energized irrespective of which one of the contact-making devices 21 of the relays 15 and 16 is actuated. A similar circuit 46 comprises a source of electromotive force 47, the trip coil winding 14, a switch 50 and the contact-making devices 21 of the relays 17 and 18. These contact devices are connected in parallel for the reason set forth with respect to the circuit 44. The switches 50 and 51 are actuated by the circuit interrupters 11 and 12, respectively, and are provided for the purpose of rendering one of the circuit interrupters non-automatic after the other one has been tripped.

Under normal conditions of operation, the direction of flow of energy is from the generator 1 through the feeder circuits 4 and 5 and the distribution circuit 6 to the trolley circuit 8. Since the feeder circuits 4 and 5 are connected in parallel relation and carry the same amount of current, no current normally traverses the auxiliary circuits 48 and 49, no matter whether the energy flows from the generator to the trolley circuit 8 or is regenerated and flows back to the generator 1. Thus, under normal conditions, no current traverses the windings 19. However, the windings 20 are always energized in accordance with the voltage of the circuit 6. The normal direction of current flow in the various circuits is indicated by the full-line arrows.

If a short circuit occurs at the point X in the feeder circuit 5, current will traverse the auxiliary circuits 48 and 49 because energy is now delivered from the feeder circuit 4 through the circuit 6 to the feeder circuit 5. The current traversing the transformers 32 and 33 is likewise reversed, and the circuits 48 and 49 are no longer connected to points of equal potential on the circuits 37 and 36, respectively. Thus, current traverses the windings 19 of the relays 17 and 18 in a direction opposite to the direction in which current traverses the windings 20 of the relays 17 and 18, and current traverses the windings 19 of the relays 15 and 16 in the same direction in which current traverses the windings 20 of the respective relays. Since the relays 15, 16, 17 and 18 are reverse-energy relays and only operate when the direction of current in their respective voltage and current windings are reversed, only the relays 17 and 18 are actuated, and the contact making devices 21 of the relays 17 and 18 are both closed to complete the circuit 46. When the circuit 46 is closed, the circuit interrupter 12 is tripped to disconnect the feeder circuit 5 from the distributing circuit 6. The direction of flow of the current, under the condition set forth, is illustrated by the dot-and-dash arrows in the drawing.

If a ground occurs in the conductor 28 at a point Y, the current reverses only in the transformer 32. In this case, current traverses only the windings 19 of the relays 15 and 17 in the direction shown by the dot-and-dash arrow and, since the direction of flow in the winding 19 of the relay 17 is opposite to that of the direction of flow in the winding 20, the contact-making device 21 of the relay 17 completes the circuit 46 to trip the circuit interrupter 12.

If a ground occurs at the point Z in the conductor 29, the current in the transformer 33 alone reverses, and current traverses the circuit 48 to energize the windings 19 of the relays 16 and 18. But, since the directions of current flow thus become relatively reversed in the windings 19 and 20 of the relay 18 only, the contact making device 21 of that relay is actuated to complete the circuit 46 and thereby trip the circuit interrupter 12.

When the circuit interrupter 12 is tripped by the occurrence of any of the above mentioned conditions, the switch 51 is opened to thereby render the circuit interrupter 11 non-automatic. This is done in order that, if the energy flows from the circuit 8 to the circuit 3, the circuit interrupter 11 will not open the circuit of the feeder 4.

It will be understood that the relays are arranged in pairs, the potential windings of the pairs being 180° out of phase with respect to each other and the current windings being connected in series relation and in phase and are supplied with current only when there is a difference in direction or magnitude of the flow of current in the feeders 4 and 5. The same effect will be produced when energy traverses the feeders 4 and 5 in the reverse direction. If the ground or short circuit occurs on the feeder 4, the relays 15 and 16 will operate to disconnect that feeder from the distributing circuit 6 in substantially the manner set forth with respect to the relays 17 and 18.

It will be understod that various modifications and refinements may be embodied in our invention without departing from the spirit and scope of the same as set forth in the appended claims.

We claim as our invention:

1. In a distributing system, the combination with a distributing circuit and two parallel feeder circuits operatively connected to the distributing circuit, of means for cumulatively combining currents proportional to the currents traversing the respective conductors of the feeder circuits, and a reverse-energy relay for each of the conductors of the feeder circuits, said relays being arranged in pairs, the current windings of each pair being connected in series and supplied with current proportional to the difference between the currents traversing the conductors of the feeder circuits, and the potential windings of each pair being connected in parallel but 180° out of phase with respect to each other and supplied with current proportional to the potential of the distributing circuit.

2. The combination with two parallel-connected feeder circuits, a distributing circuit and circuit interrupters for the feeder circuits, of circuits for cumulatively combining currents that are proportional to the currents traversing the conductors of one feeder circuit with currents correspondingly proportional to the currents of the respective conductors of the other feeder circuit, and two pairs of reverse-energy relays, the current windings of each pair being so connected as to be energized by current proportional to the difference between the currents traversing the conductors of the feeder circuits and one potential winding of each pair being connected 180° out of phase with the other potential winding of the respective pair, said potential windings being supplied with current proportional to the potential of the distributing circuit, said pairs of relays being adapted to trip the said circuit interrupter under predetermined conditions in the feeder circuits.

3. In an electrical distributing system, the combination with a distributing circuit and two sets of parallel-connected feeder circuits, of two auxiliary circuits for cumulatively combining currents that are proportional to the currents traversing corresponding conductors of the feeder circuits, and relays so connected to the two auxiliary circuits and the said distributing circuits that, when the currents that traverse the conductors of one feeder circuit are of different magnitude or direction than those that traverse the other, the defective feeder circuit will be disconnected from the distributing circuit irrespective of the direction of flow of energy in the system.

4. In an electrical distribution system, the combination with a distributing circuit, two parallel-connected feeder circuits and means for disconnecting the said feeder circuits from the distribution circuit, of auxiliary electrical circuits for cumulatively combining currents that are proportional to the currents traversing the corresponding conductors of the said feeder circuits, and reverse-energy relays so connected to the auxiliary electrical circuits and to the distributing circuit that the means for disconnecting the feeder circuits from the distributing circuit is selectively tripped when a ground or a short circuit occurs upon the feeder circuits irrespective of the direction of the flow of energy therein.

5. In a system of distribution, the combination with two parallel feeder circuits, a distribution circuit and circuit interrupters for operatively connecting the feeder circuits to the distribution circuit, of means for cumulatively combining the effects of the currents traversing the corresponding conductors of the two feeder circuits, and reverse-energy relays operatively connected to the said means for cumulatively combining the effects of the currents traversing the conductors of the feeder circuits and to the distributing circuit for selectively tripping either circuit interrupter when its respective feeder circuit become defective, irrespective of the direction of flow of energy in the system.

6. In a distributing system, the combination with a plurality of feeder circuits, a distributing circuit and circuit interrupters operatively connected between the feeder circuits and the distributing circuit, of auxiliary circuits so connected to the corresponding conductors of the feeder circuits that current proportional to the current traversing the feeder circuits normally traverses the auxiliary circuits, and reverse-energy relays operatively connected to the auxiliary circuits and to the distributing circuit for selectively tripping the circuit interrupters under predetermined conditions irrespective of the direction of flow of energy in the system.

7. In a distributing system, the combination with a plurality of feeder circuits, a distributing circuit and circuit interrupters operatively connected between the feeder circuits and the distributing circuit, of auxiliary circuits for connecting the corresponding conductors of the feeder circuits together, and reverse-energy relays so connected to the auxiliary circuits and to the distributing circuit that they selectively trip one of the circuit interrupters when the energy is reversed in any of the feeder circuits by a short circuit or a ground, irrespective of the normal direction of flow of energy in the system.

8. In a distributing system, the combination with parallel-connected feeder conductors and circuit interrupters therefor, of auxiliary circuits operatively connected to the feeder conductors, and two pairs of reverse-energy relays for controlling the interrupters, the current windings of the respective pairs of relays being connected in series across normally equal-potential points on the auxiliary circuit and the potential windings of one pair of relays being connected to the feeder conductors 180° out of phase with the potential windings of the other pair.

9. In a distributing system, the combination with parallel-connected feeder conductors and circuit interrupters therefor, of an auxiliary circuit operatively connected to the feeder conductors, and reverse-energy relays for controlling the interrupters, the current windings of the relays being connected in series across the auxiliary circuit and the potential windings being connected to the feeder conductors, said potential windings being 180° out of phase with respect to each other.

10. In a distributing system, the combination with parallel-connected feeder conductors and circuit interrupters therefor, of auxiliary circuits for combining the effects of the currents traversing the corresponding feeder conductors, and reverse-energy relays so connected to the auxiliary circuits and to the feeder conductors as to selectively trip the circuit interrupters when their respective feeder conductors become defective, irrespective of the direction of flow of energy in the system.

11. In a distributing system, the combination with parallel-connected feeder conductors and circuit interrupters for each of said conductors, of reverse-energy relays for selectively tripping the circuit interrupters when their respective feeder conductors become defective, irrespective of the direction of flow of energy in the system.

12. In a distributing system, the combination with parallel-connected feeder conductors and circuit interrupters for each conductor, of reverse-energy protective means for selectively tripping the circuit interrupters of a defective feeder conductor, irrespective of the direction of flow of energy in the system.

13. In a distributing system, the combination with parallel-connected feeder conductors, of reverse-energy protective means having current windings and potential windings that are 180° out of phase with respect to each other to the effect selective operation when one of the conductors becomes defective, irrespective of the direction of flow of energy in the system.

14. In a distributing system, the combination with parallel-connected feeder conductors, of reverse-energy relays having current windings and out-of-phase potential windings to effect selective operation of the same when one of the conductors becomes grounded, irrespective of the direction of flow of energy in the system.

15. In an electric distributing system, the combination with parallel-connected feeder conductors and circuit interrupters for each conductor, of reverse-energy relays for selectively tripping the interrupters in the defective conductors, irrespective of the direction of flow of energy in the system.

16. In a distributing system, the combination with parallel-connected feeder conductors and circuit interrupters for disconnecting each of the conductors from the system, of reverse-energy relays having series-connected current windings and potential windings connected out of phase with respect to each other to effect selective operation of the interrupters when a fault obtains therein irrespective of the direction of flow of energy in the system.

17. In a distribution system, the combination with parallel-connected feeder circuits, of interrupters for each of the said circuits, and reverse-energy relays for the said interrupters, said relays having the windings thereof so connected that they effect selective operation of the interrupters irrespective of the direction of flow of energy of the system.

In testimony whereof, we have hereunto subscribed our names this 28th day of May, 1915.

CHARLES McL. MOSS.
FREDERIC C. HANKER.
HENRY A. TRAVERS.
FRANK CONRAD.